(12) United States Patent
Boucadair et al.

(10) Patent No.: US 10,819,830 B2
(45) Date of Patent: Oct. 27, 2020

(54) MULTI-PATH TCP COMMUNICATION METHOD BETWEEN TWO TERMINALS

(71) Applicant: Orange, Paris (FR)

(72) Inventors: Mohamed Boucadair, Betton (FR); Christian Jacquenet, Pont-pean (FR)

(73) Assignee: ORANGE, Paris (FR)

( * ) Notice: Subject to any disclaimer, the term of this patent is extended or adjusted under 35 U.S.C. 154(b) by 258 days.

(21) Appl. No.: 15/322,945

(22) PCT Filed: Jun. 29, 2015

(86) PCT No.: PCT/FR2015/051767
§ 371 (c)(1),
(2) Date: Dec. 29, 2016

(87) PCT Pub. No.: WO2016/001558
PCT Pub. Date: Jan. 7, 2016

(65) Prior Publication Data
US 2017/0142231 A1    May 18, 2017

(30) Foreign Application Priority Data

Jun. 30, 2014   (FR) ...................... 14 56166

(51) Int. Cl.
*G06F 15/16* (2006.01)
*H04L 29/06* (2006.01)
*H04L 12/707* (2013.01)

(52) U.S. Cl.
CPC .............. *H04L 69/14* (2013.01); *H04L 45/24* (2013.01); *H04L 65/1069* (2013.01); *H04L 69/16* (2013.01)

(58) Field of Classification Search
CPC ..... H04L 69/14; H04L 45/24; H04L 65/1069; H04L 69/16
See application file for complete search history.

(56) References Cited

U.S. PATENT DOCUMENTS

| 9,531,606 B2 * | 12/2016 | Kneckt | ................ H04L 43/062 |
| 2010/0322213 A1 * | 12/2010 | Liu | ...................... H04W 48/16 370/338 |
| 2016/0212759 A1 * | 7/2016 | Schliwa-Bertling | .... H04L 69/14 |

OTHER PUBLICATIONS

G. Hampel et al, "MPTCP Proxies and Anchors", Feb. 8, 2012 (Year: 2012).*

(Continued)

*Primary Examiner* — Ryan J Jakovac
(74) *Attorney, Agent, or Firm* — David D. Brush; Westman, Champlin & Koehler, P.A.

(57) ABSTRACT

A communication method includes: a) receiving, by a client device suitable for implementing a simple transmission control protocol connection or a multipath connection, or else a relay device connected to the client device and suitable for implementing a multipath connection, in the absence of any multipath connection between the client device or the relay device as the case may be and some other client device, information about the compatibility, if any, with multipath connections of at least one intermediate node placed on a path connecting the client device, or the relay device, as the case may be, to the other client device; and b) the client device or the relay device storing the status of the path concerning its compatibility, if any, with multipath connections.

18 Claims, 3 Drawing Sheets

(56) References Cited

OTHER PUBLICATIONS

A. Ford et al, "TCP Extensions for Multipath Operation with Multiple Addresses", Jan. 2013 (Year: 2013).*
M. Scharf et al, "Multipath TCP (MPTCP) Application Interface Considerations", IETF, Mar. 2013 (Year: 2013).*
International Search Report dated Sep. 11, 2015 for corresponding International Application No. PCT/FR2015/051767, filed Jun. 29, 2015.
Wing et al., "Multipath TCP (MPTCP) Path Selection using PCP; draft-wing-mptcp-pcp-OO.txt" Multi Path TCP (MPTCP) Path Selection Using PCP; Draft-Wing-MPTCP-PCP-00.TXT, Internet Engineering Task Force, IETF; Standardworkingdraft, Internet Society (ISOC) 4, Rue Des Falaises CH—1205 Geneva. Switzerland, Oct. 7, 2013 (Oct. 7, 2013). pp. 1-10, XP015095076.
Ford et al., "TCP Extensions for Multipath Operation with Multiple Addresses; rfc6824.txt", TCP Extensions for Multipath Operation With Multiple Addresses; RFC6824.TXT, Internet Engineering Task Force. IETF; Standard, Internet Society (ISOC) 4, Rue Des Falaises CH—1205 Geneva, Switzerland, Jan. 17, 2013 (Jan. 17, 2013), pp. 1-64, XP015086539.
Deng et al. "Use-cases and Requirements for MPTCP Proxy in ISP Networks; draft-deng-mptcp-proxy-OO.txt", Use-Cases and Requirements for MPTCP Proxy in ISP Networks; Draft-Deng-MPTCP-Proxy-00.TXT, Internet Engineering Task Force, IETF; Standardworkingdraft, Internet Society (ISOC) 4, Rue Des Falaises CH—1205 Geneva. Switzerland, May 29, 2014 (May 29, 2014), pp. 1-18, XP015099305.

Boucadair, "MPTCP Connectivity Checks" Mar. 4, 2015 (Mar. 4, 2015), XP055180730. Retrieved from the Internet: URL: http://tools.ietf.orgjpdf/draft-boucadair-mptcp-connectivity-checks-00.pdf.
Boucadair et al., "Discovering the Capabilities of Flow-Aware Service Functions (a.k.a. Middleboxes): A PCP-based Approach; draft-boucadair-hops-capability-discovery00.txt", Discovering the Capabilities of Flow-Aware Service Functions (a.k.a. Middleboxes): A PCP-Based Approach; Draft-Boucadair-Hops-Capability-Discovery-00.TXT, Internet Engineering Task Force, IETF; Standardworkingdraft, Internet Society (ISOC) 4, Rue Des, Jun. 30, 2015 (Jun. 30, 2015), pp. 1-12, XP015107020.
Boucadair et al., "Probing MPTCP Subflows; draft-boucadair-mptcp-probe-subflow-00.txt", Probing MPTCP Subflows; Draft-Boucadair-MPTCP-Probe-Subflow-00.TXT, Internet Engineering Task Force, IETF; Standardworkingdraft, Internet Society, (ISOC) 4, Rue Des Falaises CH—1205 Geneva, Switzerland, Jul. 6, 2015 (Jul. 6, 2015), pp. 1-7, XP015107253.
Written Opinion of the International Searching Authority dated Sep. 11, 2015 for corresponding International Application No. PCT/FR2015/051767, filed Jun. 29, 2015.
English translation of the Written Opinion of the International Searching Authority dated Sep. 11, 2015 for corresponding International Application No. PCT/FR2015/051767, filed Jun. 29, 2015.
Information Sciences Institute University of Southern California, "Transmission Control Protocol DARPA Internet Program Protocol Specification", Sep. 1981, RFC 793.
Scharf et al., "Multipath TCP (MPTCP) Application Interface Considerations" Internet Engineering Task Force (IETF), RCE 6897, Mar. 2013.

* cited by examiner

MULTI-PATH TCP COMMUNICATION METHOD BETWEEN TWO TERMINALS

CROSS-REFERENCE TO RELATED APPLICATIONS

This Application is a Section 371 National Stage Application of International 5 Application No. PCT/FR2015/051767, filed Jun. 29, 2015, the content of which is incorporated herein by reference in its entirety, and published as WO 2016/001558 on Jan. 7, 2016, not in English.

FIELD OF THE DISCLOSURE

The present invention relates to the field of telecommunications, and in particular communications networks suitable for implementing the Internet protocol (IP). More particularly, the present invention relates to supplying "added-value" services in IP networks, i.e. networks that are capable of performing differentiated treatments depending on the nature of the data traffic conveyed in the network.

The invention applies to any type of client device such as a fixed or mobile terminal, or a residential gateway or a business gateway, or an operator gateway, or indeed a TV decoder (also known as a "set-top-box" (STB)). For reasons of concision, a client device of any type is often referred to below as a "terminal".

BACKGROUND OF THE DISCLOSURE

Terminals, such as smartphones and personal computers (PC) are nowadays capable of activating and using a plurality of logic interfaces associated with one or more physical interfaces. Such terminals are said to be multi-interface (MIF) terminals. When a terminal has a plurality of interfaces capable of connecting to different access networks (e.g.: fixed, mobile, or wireless local area network (WLAN)), it benefits from access that is said to be "hybrid" since it combines different access network technologies.

A plurality of IP addresses can then be allocated to such MIF terminals so that they can connect to different types of network, such as a fixed network, a mobile network, or a WLAN, in simultaneous manner or in deferred manner. These IP addresses may:

belong to the same family of addresses or to two different families of addresses (IPv4, IPv6, or both);
have different lifetimes;
have different coverage ranges, e.g. a private IPv4 address, a unique IPv6 address having local range (unique local address or (ULA)), or an IPv6 address of global range (global unicast address (GUA)); and
be allocated to the same logic network interface or to different logic network interfaces.

Nevertheless, is should be observed that the "MIF" characteristic is volatile, since the capability of using a plurality of interfaces depends on network connection conditions, on the location of the device, or on other factors. In particular, a MIF device can make use of the plurality of interfaces available to it while setting up a simple connection (i.e. a connection that is set up along a single path to a given party), or indeed after setting up a simple connection. It should also be observed that a device does not know a priori whether it is possible to use a plurality of distinct paths for setting up a connection with a given party; more precisely, the device acquires this information (where applicable) only at the end of a stage during which it attempts to set up a connection using multiple paths with that party.

It should be recalled that a "multipath connection" is a connection set up between two devices making use simultaneously of one or more paths between the two devices. Such a connection applies a dedicated protocol such as multipath TCP (MPTCP), which may be defined as being an extension of a previously-defined transport protocol such as transmission control protocol (TCP). In other words, a multipath connection is an aggregation of one or more simple connections using a single path or paths that are different (partially or completely disjoint).

It should also be recalled that the TCP protocol, as defined in particular in the Internet engineering task force (IETF) specification RFC 793, is one of the main protocols used by terminals connected to an IP network (e.g. the Internet), such that the literature often mentions the "TCP/IP" protocol suite. The TCP protocol makes it possible in reliable, ordered, and error-free manner to convey a digital data stream between applications that are being executed on terminals connected to a local network (e.g. an Intranet) or to the Internet. It operates at the transport layer level of the open source interconnection (OSI) model. Web browsers use the TCP protocol when they connect to remote servers; the TCP protocol is also used for conveying email or for transferring files from one location to another. Protocols such as HTTP, HTTPS, SMTP, POP3, IMAP, SSH, FTP, Telnet, and numerous other protocols are transported over TCP connections. A TCP connection is identified by the address and the port number of the source terminal and by the address and the port number of the destination terminal.

Two terminals may insert so-called "TCP options" in the TCP messages they exchange, e.g. in order to optimize the quality of TCP transmission. Such options occupy the space available at the end of the TCP header, and they are of a length that is expressed in octets. The kind of option is a unique identifier describing the nature of the TCP option. For example, the value "0" indicates the end of the list of options, and the value "2" indicates the maximum size of the TCP segment, referred to as the maximum segment size (MSS).

The arrival of MIF terminals introduces additional complexity for using some or all of the IP addresses allocated via the available networks. In particular, given that TCP connections are associated with an IP address and a port number, any modification to this information will penalize the operation of an on-going TCP connection, and as a result the operation of the service using said TCP connection. Such a change is particularly troublesome when the terminal is given a new IP address, either because the terminal is connecting to another network or indeed when the interface at which the IP address is associated is no longer available. For example, means for informing a remote TCP party that an IP address is no longer valid are then required in order to ensure that a remote connection is maintained.

In 2009, the IETF commissioned the mptcp workgroup in order to specify extensions to the TCP protocol capable of accommodating constraints imposed by the possibility of allocating a plurality of IP addresses to various physical or logical interfaces of a terminal. That workgroup has published initial specifications for the MPTCP protocol (cf. A. Ford, C. Raiciu, and M. Handley "TCP extensions for multipath operations with multiple addresses", RFC 6824, January 2013), and some smartphones and operating systems are already capable of implementing them. The IETF expects to raise the status of present-day MPTCP "specifications" so that they become genuine "standards" in the meaning of the IETF.

The MPTCP protocol has thus been proposed to minimize any risk of a TCP connection being interrupted in untimely manner associated with such changes of addressing, and more generally to satisfy the requirements made necessary by a context in which a terminal has the ability to connect to one or more networks via one or more interfaces. The MPTCP protocol serves in particular to satisfy the need to ensure session continuity for a terminal that is mobile. Various circumstances of use can be envisaged for the MPTCP protocol, such as:

transferring traffic between a plurality of WLAN access points;
off-loading a mobile network, and transferring traffic to a WLAN access point;
aggregating a plurality of access links;
sharing load between a plurality of paths; and
optimizing the use of network resources.

In this respect, it should be recalled (cf. Wikipedia) that in the field of networks "aggregating links" is a concept describing grouping together a plurality of network interfaces as though there was a single interface, in order to increase data rate beyond the limits of a single link, and possibly in order to ensure that other interfaces take over if a link fails (redundancy principle).

A particularly advantageous example application of the MPTCP protocol is transferring voluminous files while using the resources of the file transfer protocol (FTP). A device acting as an FTP client can make use dynamically of all of the available paths that enable that device to access an FTP server, providing the server is suitable for making use of the various MPTCP connections set up by the FTP client. The time required to transfer data is thus significantly reduced compared with a TCP connection.

In the context of MPTCP, the term "sub-flow" is used to designate a TCP connection that relies on using one of the available IP address and port number pairs. As a result, an MPTCP connection is an aggregation of TCP sub-flows. By way of example, FIG. 1 shows an MPTCP connection between a terminal A and a terminal B; the initial sub-flow is set up between address A1 of terminal A and address B1 of terminal B; subsequently, an additional sub-flow is set up between address A2 of terminal A and address B1 of terminal B.

Operating systems present applications with dedicated interfaces known as application programming interfaces (APIs) enabling them to interact with the TCP and IP layers. The conventional API presented to TCP/IP applications is the "socket" interface. A "socket" is characterized by a plurality of "attributes" such as "local socket address", "remote socket address", and "protocol". New extensions (MPTCP API) have been specified by the IETF in document RFC 6897 to enable applications to control MPTCP connections. It should be observed that the MPTCP API is an extension of the TCP API.

The term "MPTCP connection table" designates a software structure used to group together all of the TCP sub-flows associated with a given MPTCP connection. Several attributes can be used for characterizing an MPTCP connection table. In addition to the above-mentioned conventional TCP/IP attributes, values given to attributes that are specific to the MPTCP protocol. The values of these attributes of the connection table are controlled via the MPTCP API.

An MPTCP connection is initialized like any conventional TCP connection, except that the MP_CAPABLE option (meaning that the sender terminal is compatible with MPTCP extensions) is included in the message containing the connection initialization flag (SYN) and in the subsequent messages. An MPTCP terminal can inform the remote terminal about the availability of an additional IP address by using the ADD_ADDR option without necessarily creating an associated sub-flow.

Nevertheless, signaling a plurality of IP addresses that are available and suitable for use for communicating with a party can lead to failure to set up certain TCP sub-flows because the external IP addresses as perceived by the remote terminals need not be the same as those that are visible locally. That is why the ADD_ADDR option of the MPTCP protocol includes an address identifier (address ID) that is used for identifying an available IP address without ambiguity. In the state of the art, this provision is supposed to avoid problems induced by the presence of a network address translator (NAT) on the path followed by the packets between the two terminals that have set up an MPTCP connection. The ADD_ADDR option is also used for transmitting a port number in the event of one of the MPTCP terminals not using the same port number for all of the available IP addresses.

Likewise, the MPTCP protocol has provisions that are intended specifically to make it possible to pass through firewalls. More precisely, the specification of the MPTCP protocol stipulates that the sequence numbers as indicated in the TCP header are specific to each sub-flow, while the sequence number given in the data sequence signal (DSS) option of the MPTCP protocol serves to associate these sub-flows with the same MPTCP connection.

The MPTCP protocol thus seeks to counter the massive proliferation in present-day networks of "middle boxes" (i.e. pieces of equipment in intermediate positions in a communication chain) such as NATs, and firewalls. In addition, document RFC 6824 makes provision that in the event of a failure of an attempt to set up an MPTCP connection, the connection transforms automatically into a simple TCP connection.

Unfortunately, in spite of all those precautions, other problems can arise when attempting to set up an MPTCP connection. For example:

certain MPTCP options, or indeed all of them, may be filtered (i.e. removed) by intermediate nodes (e.g. a NAT or a firewall) situated in series between two MPTCP peers, as shown in FIG. 2;

even if the above-mentioned SYN MPTCP messages are successfully exchanged between two MPTCP peers, intermediate nodes can filter the above-mentioned DSS options from the data packets; under such circumstances, and as shown in FIG. 3, the attempt at setting up an MPTCP connection cannot succeed, with the consequence of falling back on a simple TCP connection, as in the situation shown with reference to FIG. 2; and it may happen that a first TCP sub-flow is established successfully, but that multiple sub-flows fail to be set up for lack of multiple paths that are compatible with MPTCP extensions.

Unfortunately, the authors of the present invention have found that the presence of such intermediate nodes has the effect of significantly lengthening the time required for setting up TCP sub-flows, and consequently has a negative impact on the quality of service of a communication, as perceived by the user.

SUMMARY

The present invention thus provides a communication method comprising the following steps:

a) a client device suitable for implementing a simple transmission control protocol connection or a multipath connection, or else a relay device connected to said client device and suitable for implementing a multipath connection, receiving, in the absence of any multipath connection between said client device or said relay device as the case may be and some other client device, information about the compatibility, if any, with multipath connections of at least one intermediate node placed on a path connecting the client device, or said relay device, as the case may be, to said other client device; and b) the client device or said relay device storing the status of said path concerning its compatibility, if any, with multipath connections.

It may be observed that the invention can be performed by any TCP compatible client device. The client device may have one or more external addresses, or one or more network interfaces (which may be logical or physical). However the client device might have only one interface if it is situated behind a relay device (such as a router or a residential gateway) connected to one or more networks and compatible with multipath TCP options.

The communications devices involved (client devices and relay devices) may be of any type, e.g. a terminal, a router, or a residential gateway.

By means of the invention, these communications devices can discover the capabilities of any "intermediate equipment" (such as the above-mentioned middle boxes) and can anticipate the failure of multipath connections. This shortens the delay for setting up multipath connections and thus clearly significantly improves the quality of user experience.

Furthermore, such a device can:
adjust its behavior as a function of how it is attached to a network (e.g. when attached to a new network, non-availability of a network interface, or detecting "intermediate equipment"); and
decide, without any risk of degrading the quality of communication with the other party, to activate a multipath connection or to deactivate an ongoing multipath connection or all ongoing multipath connections, or indeed to add a new TCP sub-flow to an ongoing multipath connection.

Furthermore, said multipath connection may advantageously comply with the MPTCP protocol, so as to benefit from the provisions of that protocol as mentioned briefly above.

In a first variant, during said step a), the client device, or the relay device, as the case may be, receives said information within a non-requested message broadcast by said intermediate node.

By means of these provisions, reception of said information by the client device or the relay device is automatic.

In a second variant:
the client device, or the relay device, as the case may be, sends a request to said intermediate node; and
during said step a), it receives said information within a response message sent by the intermediate node.

By means of these provisions, the client device or the relay device can obtain said information each time it needs it.

It should be observed that a communications device (such as a client device or a relay device) may be suitable for performing both of the variants described briefly above, or only one of them. Furthermore, a communications device may use one or both variants for some of the available multiple paths and use any third variant to verify compatibility of the other paths with the multipath connections; the communications device may in particular proceed in this way when some of the discovered intermediate nodes are not suitable for performing either of the two variants set out briefly above.

In other particular characteristics, if the client device or said relay device, as the case may be, finds that no path connecting the client device to said other client device is compatible with multipath connections, the method further comprises a step during which the client device uses a simple TCP connection:
to set up a connection with said other client device; or
to connect to the other client device after receiving a message setting up a multipath connection sent by the other client device.

These provisions serve to avoid any delay that might stem from an attempt at setting up a multipath connection over a path that is incompatible with such a connection.

In contrast, if the client device, or said relay device, as the case may be, observes that at least one of the paths connecting the client device to said other client device is compatible with multipath connections, the method further comprises a step during which the client device, or the relay device, as the case may be, uses a multipath connection protocol for communicating with said other client device over said path that is compatible with multipath connections.

In particular, the two peers could set up between them a multipath connection along a path that was previously considered as being incompatible with such a connection, if there is a change in the circumstances that previously led to a fallback to a simple TCP connection.

It may be observed that the invention applies particularly to the situation in which there exist at least two possible communication paths between a first client device and a second client device, even if only one usable path exists when initializing a TCP connection. The invention is preferably implemented for each of the possible communication paths between the two client devices, as a result of that path being discovered by one or the other of the client devices; this makes it possible to obtain maximum benefit from the possibilities made available by the multipath connections.

Correspondingly, the invention provides various devices.

Thus, firstly, the invention provides a communications device possessing means for implementing a simple TCP connection or a multipath connection. Said device is remarkable in that it further possesses means for:
receiving, in the absence of any multipath connection between said communications device and some other communications device, information about the compatibility, if any, with multipath connections of at least one intermediate node placed on the path connecting said communications device to said other communications device; and
storing the status of said path about its compatibility, if any, with multipath connections.

According to particular characteristics, said communications device further comprises means for:
sending a request to said intermediate node; and
receiving said information within a response message sent by the intermediate node.

According to other particular characteristics, said communications device comprises a client device, such as a user terminal.

According to even more particular characteristics, said communications device further comprises means for:
observing that no path connecting said communications device to said other client device is compatible with multipath connections; and using a simple TCP connection:
to set up a connection with the other client device; or
to connect to the other client device after receiving a message for setting up a multipath connection sent by the other client device.

According to other even more particular characteristics, said communications device further comprises means for:
observing that at least one path connecting said communications device to said other client device is compatible with multipath connections; and
using a multipath connection protocol for communicating with the other client device over said path that is compatible with multipath connections.

According to other particular characteristics, said communications device comprises a relay device, such as a router or a residential gateway, connected to a client device.

According to even more particular characteristics, said communications device further comprises means for:
observing that no path connecting it to said other client device is compatible with multipath connections; and
if it receives a message for initializing a multipath connection from said client device for relaying to the other client device, responding to the client device without using the multipath connection protocol in its response.

By means of these provisions, the client device to which the relay device is connected then switches over without delay to a simple TCP connection.

The advantages made available by these communications devices are essentially the same as those made available by the corresponding methods described above briefly.

Secondly, the invention also provides a node of an IP network. Said node is remarkable in that it comprises means for broadcasting non-requested messages containing information about the compatibility, if any, of said node with multipath connections.

In a variant, said node comprises means for:
receiving from a communications device, in the absence of any multipath connection set up by said communications device over a path passing via said node, a request about the compatibility, if any, of the node with multipath connections; and
responding to said communications device by means of a message containing information about the compatibility, if any, of the node with multipath connections.

It should be observed that a node may be suitable for implementing both of the variants described above briefly, or only one of them.

By way of example, the nodes may comprise a NAT or a firewall.

The advantages made available by these nodes are essentially the same as those made available by the corresponding methods set out above briefly.

It should be observed that it is possible to make these various devices in the context of software instructions and/or in the context of electronic circuits.

The invention also provides a computer program downloadable from a communications network and/or stored on a computer-readable medium and/or executable by a microprocessor. The computer program is remarkable in that it comprises instructions for executing steps of the communications method set out briefly above, when executed on a computer.

The advantages made available by the computer program are essentially the same as those made available by said method.

Other aspects and advantages of the invention appear on reading the following detailed description of particular implementations given as non-limiting examples.

BRIEF DESCRIPTION OF THE DRAWINGS

The description refers to the accompanying figures, in which.

DETAILED DESCRIPTION OF ILLUSTRATIVE EMBODIMENTS

Figure 1:
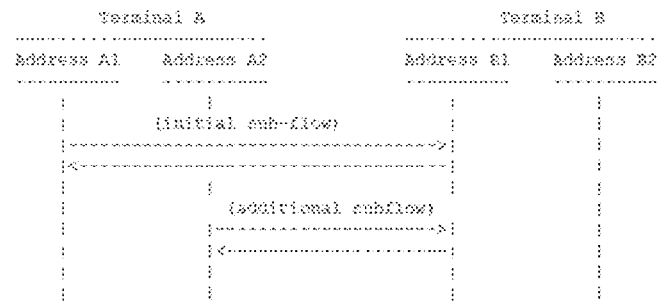
FIG. 1, described above, shows an aggregation of TCP sub-flows forming a single MPTCP connection.
Figure 2:
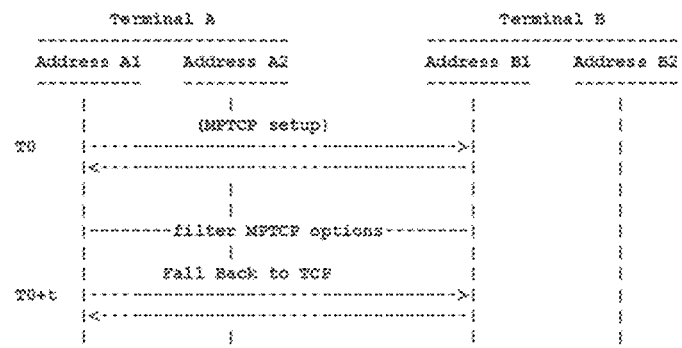
FIG. 2, described above, shows the failure of an attempt at setting up an MPTCP sub-flow to the terminal B from a terminal A as a result of MPTCP options being filtered by intermediate nodes.
Figure 3:
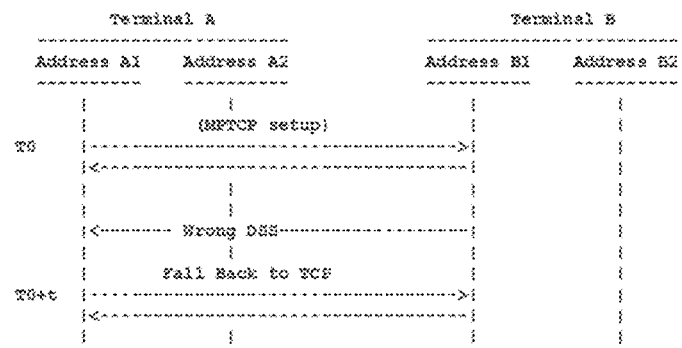
FIG. 3, described above, shows the failure of an attempt at setting up an MPTCP sub-flow to the terminal B from a terminal A as a result of DSS options filtered by intermediate nodes.

By way of example, the discovery of the various paths connecting a given terminal to a given party may be achieved by using a dynamic IP address allocation protocol such as dynamic host configuration protocol (DHCP), or by a mapping creation mechanism such as port control protocol (PCP), universal plug and play (UPnP), Internet gateway device (IGD), or session traversal utilities for NAT (STUN). In this respect, it should be recalled that a "mapping" designates the association between an internal IP address and an internal port number with an external IP address and an external port number. With a NAT function, the internal IP address and the internal port number are input data items, while the external IP address and the external port number are allocated by the NAT function. With a firewall, the internal and external information is identical. A mapping may include other information, such as the IP address and the port number of the correspondent or an identifier of the communications protocol in use.

It should be observed that the invention may be implemented both by a first client device and by a second client device with which the first client device seeks to establish a multipath connection, or by only one of them; when established by only one of them, the other client device may optionally perform a method other than the method of the invention in order to discover the multipath connection compatibility of the paths connecting together these two client devices.

The invention proposes a novel attribute to be included in multipath connection tables. This attribute is referred to as "PATH_CHECKED" and it is set to "1" to indicate that a TCP sub-flow is compatible with multipath extensions, and it is set to "0" otherwise.

The invention applies in general manner to any protocol relating to multipath connections. There follows a description of the invention being applied to the MPTCP protocol as described briefly above. In particular, the above-mentioned MPTCP API needs to be modified so as to make it possible to transmit the values of the PATH_CHECKED attribute of the invention to applications.

In conventional manner, the MPTCP protocol has various provisions, including in particular definitions of the following TCP options:

MP_CAPABLE: this option is used to inform the remote terminal that the sending terminal is compatible with MPTCP options;

ADD_ADDR: this option is used to add a new address; it includes an optional two-octet field serving also to provide a port number, where appropriate;

REMOVE_ADDR: this option is used for removing an address;

MP_PRIO: this option is used for modifying the priority of a connection;

MP_JOIN: this option is used for identifying the TCP connection that is associated with setting up a new sub-flow;

MP_FAIL: this option is used to return to TCP mode without MPTCP options; and

MP_FASTCLOSE: this option is used for closing an MPTCP connection quickly.

The MPTCP protocol may be activated in several modes:

native mode: two MPTCP terminals set up all of the sub-flows that correspond to the available address and port numbers, and make use of all of these sub-flows;

primary mode: two MPTCP terminals signal sub-flows, but only a subset of these sub-flows is actually used for transferring data;

secondary mode: in the event of the "primary" sub-flow subset being unavailable (or overloaded), a "secondary" subset of sub-flows is then requested to ensure continuity of the MPTCP connection; and fallback mode: two MPTCP terminals use a single sub-flow; in the event of failure, traffic is transferred to a new sub-flow that is created for this purpose.

There follows a description of an implementation of the communication method of the invention. It is assumed that this implementation is performed by a terminal T capable of making use of the resources of the MPTCP protocol, and it comprises the following steps.

During a step E1, the terminal T1 receives information about the capabilities in terms of compatibility with MPTCP options, of intermediate nodes (e.g. NAT, firewall, etc.) connected in series in the paths enabling the terminal to be reached.

In a first variant ("ANNOUNCE" mode), an intermediate node broadcasts information concerning its compatibility, if any, with MPTCP options by using messages of the type as specified for example by the service location protocol (SLP) or of the ANNOUNCE type in the port control protocol (PCP). Each message of this type contains an indicator (MPTCP_STATUS) serving to inform the terminals about the compatibility of the intermediate node with MPTCP connections. By way of example, the intermediate node sends out these messages at a regular rate (e.g. once every 30 minutes) or whenever the intermediate node starts or restarts, or in the event of a software update or of a configuration change to the intermediate node, or indeed on detecting that a terminal has become attached to the network.

In a second variant ("PULL" mode), the terminal T begins by discovering intermediate nodes, and then sends a request to each intermediate node as discovered in this way (e.g. using a protocol such as PCP) in order to obtain information about the compatibility, if any, of the intermediate node with MPTCP options. In response to such a request, the intermediate node responds with a message containing an indicator (MPTCP_STATUS) for notifying the requesting terminal of its status concerning the compatibility of the intermediate node with MPTCP connections.

By way of example, the MPTCP_STATUS indicator may be defined as follows. The value "0" indicates that all of the MPTCP options are filtered (i.e. eliminated) by the intermediate node. The value "1" indicates that the intermediate node is capable of interpreting all MPTCP options. Values other than "0" or "1" may be defined in order to indicate explicitly the list of options that the intermediate node is capable of interpreting in the event that the intermediate node filters only some MPTCP options.

During a step E2, for each discovered intermediate node, the terminal records the fact that said path is compatible or not compatible with MPTCP connections. In the present implementation:

if MPTCP_STATUS==1, then the path passing via the intermediate node is declared compatible with setting up and using MPTCP connections; the terminal T updates its MPTCP connection table by setting the PATH_CHECKED attribute to "1" to indicate that the path is compatible with the multipath communication mode;

if MPTCP_STATUS!=1, the path passing via the intermediate node is declared to be incompatible with MPTCP communications; the terminal T updates its MPTCP connection table by setting the PATH_CHECKED attribute to "0" to indicate that this path is not compatible with the multipath communication mode.

Thereafter, each time the terminal becomes attached to a new network or whenever a new intermediate node is detected, the terminal T performs the following step E3:

if none of the paths enabling the terminal T to be reached is compatible with MPTCP connections (i.e. if the PATH_CHECKED attribute of each of the multiple paths is set to "0"):

the terminal T uses the simple TCP transport mode to set up outgoing connections with other TCP parties (i.e. the multipath TCP mode is deactivated by this terminal until its network attachment conditions are favorably modified); and for an incoming multipath connection, the terminal T does not include MPTCP options in its messages for the other party (in other words, the terminal behaves as though it was not MPTCP-compatible); when the other party receives such a message without MPTCP options from the terminal T1, the other party switches over immediately to a simple TCP connection, in compliance with the conventional "fallback" mode; and if at least one path exists that is compatible with MPTCP connections (i.e. if the PATH_CHECKED attribute of at least one of the multiple paths is set to "1"), the terminal T uses the MPTCP options to set up multipath connections with another party over compatible paths; in so doing, the terminal T does not announce to that other party any paths that are incompatible with MPTCP connections, so as to avoid any failure of an attempt at setting up a multipath connection over such an incompatible path.

Figure 4:
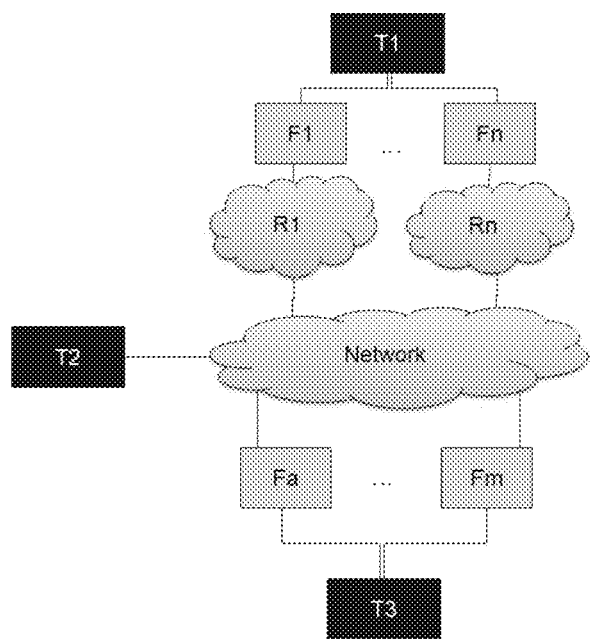
FIG. 4 shows an example application of the invention to a network configuration having three terminals T1, T2, and T3.

FIG. 4 shows an example of the invention applied to a network configuration having three terminals T1, T2, and T3. In this figure there can be seen:

a terminal T1 connected to one or more IP networks via n connection nodes (F1, F2, . . . , Fn) and n respective access networks R1, R2, ..., Rn; these connection nodes may host NAT, firewall, etc. functions, or they may be IP routers that do not include any advanced service functions such as a NAT or a firewall;

a terminal T2 connected to an IP network via a single connection node; it is assumed that T2 is compatible with MPTCP, and that a single IP address has been allocated thereto; and a terminal T3 connected to one or more IP networks via m connection nodes (Fa, Fb, ..., Fm); these nodes may host NAT, firewall, etc. functions, or they may be IP routers that do not include any advanced service function such as a NAT, or a firewall.

The terminal T1 initializes the procedure for detecting functional capabilities of the present implementation. At the end of this procedure, T1 concludes that:

F1 filters MPTCP options;

F2 only filters the MPTCP options from data packets; and

Fn neither filters nor modifies any MPTCP option.

T3 initializes the procedure for detecting functional capabilities of the present implementation. At the end of this procedure, T3 concludes that:

Fa filters MPTCP options;

Fb neither filters nor modifies any MPTCP option; and

Fm neither filters nor modifies any MPTCP option.

The valid MPTCP paths between T1 and T3 are then as follows:

the path passing via Fn and Fb; and the path passing via Fn and Fm.

The terminals T1 and T3 cannot use MPTCP if paths other than those two paths are selected for exchanging data between T1 and T3.

Figure 5:
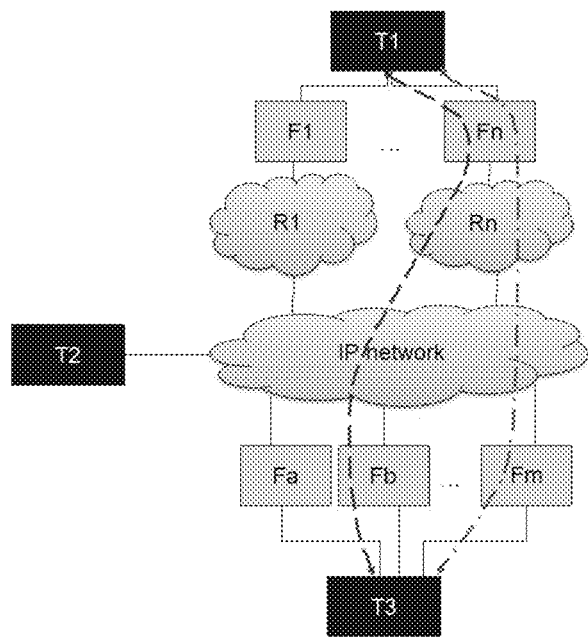
FIG. 5 shows the TCP sub-flows set up between the terminals T1 and T3 of FIG. 4.

It is assumed below that the terminal T1 seeks to set up an MPTCP connection with the terminal T3. FIG. 5 shows the TCP sub-flows set up between T1 and T3.

The terminal T1 informs the other party that it is compatible with MPTCP connections, but it announces only the path involving Fn. The terminal T3 informs the other party that it is compatible with multipath connections, but it announces only paths involving Fb and Fm. Thus, T1 and T3 can set up:

a TCP sub-flow involving Fn (at the T1 end) and Fb (at the T3 end); and a TCP sub-flow involving Fn (at the T1 end) and Fm (at the T3 end).

Assume that the terminal T1 seeks to set up an MPTCP connection with the terminal T2.

The terminal T1 informs the other party that it is compatible with MPTCP connections, but announces only the path that involves Fn. The terminal T2 informs the other party that it is compatible with multipath connections. Thus, T1 and T2 can set up TCP sub-flows involving Fn (at the T1 end). T1 and T2 can use different port numbers to create new sub-flows associated with the multipath MPTCP connection.

Assume that the terminal T3 seeks to set up an MPTCP connection with the terminal T2.

The terminal T3 informs the other party that it is compatible with MPTCP connections, but announces only paths that involve Fb and Fm. The terminal T2 informs the other party that it is compatible with multipath connections. Thus, T3 and T2 can set up a TCP sub-flow involving Fb and Fm (at the T3 end).

Figure 6:
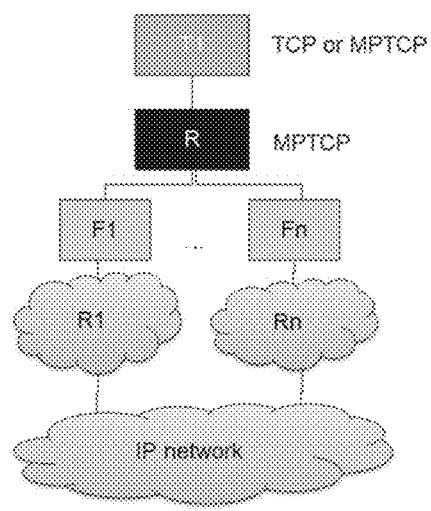
FIG. 6 shows an example application of the invention to a network configuration having a terminal placed behind a relay device.

FIG. 6 shows an example application of the invention to a network configuration having a terminal T1 that may or may not be compatible with MPTCP and that is placed behind a relay device R such as a router or a residential gateway that is compatible with MPTCP.

The relay device R is connected to one or more IP networks via n connection nodes (F1, F2, ..., Fn) and n respective access networks R1, R2, ..., Rn; these connection nodes may host NAT, firewall, etc. functions, or they may be IP routers that do not include any advanced service function such as a NAT or a firewall.

The relay device R performs the present invention to communicate with remote terminals. The relay device R announces its functional capabilities to the terminal T1 as a function of the functional capabilities of the functions Fi discovered by the relay device R. To do this, it proceeds as follows:

if at least one of the multiple paths known to the relay device R is compatible with MPTCP connections (i.e. if the PATH_CHECKED attribute of at least one of the multiple paths is set to "1"), the relay device R sends a notification message to the terminal T1 with the mention "MPTCP_STATUS=1; and if none of the multiple paths known to the relay device R is compatible with MPTCP connections (i.e. if the PATH_CHECKED attributes of all the multiple paths are set to "0"), the relay device R sends a notification message to the terminal T1 with the mention: MPTCP_STATUS!=1.

When the terminal T1 initializes a multipath connection:

the relay device R conveys the data packet using the or each path for which the PATH_CHECKED attribute is set to "1"; and if the relay device R does not have any available path that is compatible with MPTCP connections, and if it nevertheless receives a message for initializing a multipath connection from the terminal T1 (which can happen in the event that the terminal T1 is not capable of interpreting the previously-received mention MPTCP_STATUS!=1 from the relay device R), the relay device R of the invention does not transmit the initialization message to the other party; furthermore, the relay device R of the invention responds to the terminal T1 (thus passing itself off as the party in communication with the terminal T1) without including any MPTCP option in its response; T1 then switches immediately to a simple TCP connection in compliance with the conventional "fallback" mode.

The invention may be implemented within nodes of communications networks, e.g. terminals, routers, gateways, NATs, or firewalls, by using software and/or hardware components.

The software components may be incorporated in a conventional computer program for managing a network node. That is why, as mentioned above, the present invention also provides a computer system. The computer system comprises in conventional manner a central processor unit using signals to control a memory, together with an input unit or an output unit. The computer system may also be used for executing a computer program including instructions for performing any of the communications methods of the invention.

Specifically, the invention also provides a computer program as set out briefly above. The computer program may be stored on a computer-readable medium and it may be executed by a microprocessor. The program may use any programming language and may be in the form of source code, object code, or code intermediate between code source and object code, such as in a partially compiled form, or in any other desirable form.

The invention also provides a non-removable, or a partially or totally removable data medium that includes instructions of a computer program as set out briefly above.

The data medium may be any entity or device capable of storing the program. By way of example, the data medium may comprise storage means such as a read only memory (ROM), e.g. a compact disk (CD) ROM or a microelectronic circuit ROM, or magnetic recording means, such as a hard disk, or indeed a universal serial bus (USB) flash drive.

Furthermore, the data medium may be a transmissible medium such as an electrical or optical signal, suitable for being conveyed via an electrical or optical cable, by radio, or by other means. The computer program of the invention may in particular be downloaded from an Internet type network.

In a variant, the data medium may be an integrated circuit in which the program is incorporated, the circuit being adapted to execute or to be used in the execution of any of the communications methods of the invention.

Although the present disclosure has been described with reference to one or more examples, workers skilled in the art will recognize that changes may be made in form and detail without departing from the scope of the disclosure and/or the appended claims.

The invention claimed is:

1. A communication method comprising the following acts:
   a) at least one IP network node, referred to as at least one intermediate node, sending information about compatibility of said at least one intermediate node with multipath connections, said information comprising an indicator having a value selected by said intermediate node among a set of values comprising at least a first value meaning that all multipath connection options are eliminated by the intermediate node, a second value meaning that the intermediate node is capable of interpreting all multipath connection options, and at least one other value indicating explicitly at least one list of options that the intermediate node is capable of interpreting in an event that the intermediate node filters only some multipath connection options;
   b) a client device configured to implement a simple transmission control protocol (TCP) connection or a multipath connection, or else a relay device connected to said client device and configured to implement a multipath connection, receiving, in the absence of any multipath connection between said client device or said relay device and some other client device and before initiating between said client device or said relay device and some other client device any multipath connection, the information about compatibility with multipath connections of the at least one intermediate node, which is placed on at least one path connecting the client device, or said relay device, to said other client device; and
   c) the client device or said relay device storing a status of said at least one path concerning its compatibility, if any, with multipath connections, said status being determined as a function of the value of the indicator received from the at least one intermediate node.

2. The communication method according to claim 1, wherein, during said act b), the client device, or the relay device, receives said information within a non-requested message broadcast by said intermediate node.

3. The communication method according to claim 1, wherein the client device, or the relay device, sends a request to said intermediate node, and during said act b), the client device, or the relay device, receives said information within a response message sent by the intermediate node.

4. The communication method according to claim 1 wherein, if the client device or said relay device, finds that no path connecting the client device to said other client device is compatible with multipath connections, the method further comprises an act during which the client device uses a simple TCP connection:
   to set up a connection with said other client device; or
   to connect to the other client device after receiving a message setting up a multipath connection sent by the other client device.

5. The communication method according to claim 1 wherein, if the client device, or said relay device, observes that at least one path connecting the client device to said other client device is compatible with multipath connections, the method further comprises an act during which the client device, or the relay device, uses a multipath connection protocol for communicating with said other client device over said path that is compatible with multipath connections.

6. The communication method according to claim 1, wherein said multipath connection implements the multipath TCP protocol.

7. An apparatus comprising:
   at least one IP network node, referred to as at least one intermediate node, each intermediate node comprising:
      a first non-transitory computer-readable medium comprising first instructions stored thereon; and
      a first processor configured by the first instructions to perform acts comprising:
      sending information about compatibility of the intermediate node with multipath connections, said information comprising an indicator having a value selected by the intermediate node among a set of values comprising at least a first value meaning that all multipath connection options are eliminated by the intermediate node, a second value meaning that the intermediate node is capable of interpreting all multipath connection options, and at least one other value indicating explicitly at least one list of options that the intermediate node is capable of interpreting in an event that the intermediate node filters only some multipath connection options;
   a communications device, comprising:
      an interface implementing a simple transmission control (TCP) connection;
      one or more interfaces implementing a multipath connection;
      a second non-transitory computer-readable medium comprising second instructions stored thereon; and
      a second processor configured by the second instructions to perform acts comprising:
      receiving, in the absence of any multipath connection between said communications device and some other communications device and before initiating between said communications device and some other communications device any multipath connection, the information about compatibility with multipath connections of the at least one intermediate node, which is placed on at least one path connecting said communications device to said other communications device; and
      storing the status of said at least one path about its compatibility, if any, with multipath connections, said status being determined as a function of the value of the indicator received from the at least one intermediate node.

8. The apparatus according to claim 7, wherein the processor is further configured to:
send a request to said intermediate node; and
receive said information within a response message sent by the intermediate node.

9. The apparatus according to claim 7, wherein the communications device comprises a client device.

10. The apparatus according to claim 9, wherein the processor is further configured to:
observe that no path connecting said communications device to said other communications device is compatible with multipath connections; and
use a simple TCP connection:
to set up a connection with the other communications device; or
to connect to the other communications device after receiving a message for setting up a multipath connection sent by the other communications device.

11. The apparatus according to claim 9, wherein the processor is further configured to:
observe that at least one path connecting said communications device to said other communications device is compatible with multipath connections; and
use a multipath connection protocol for communicating with the other communications device over said path that is compatible with multipath connections.

12. The apparatus according to claim 9, further comprising a relay device connected to the client device.

13. The apparatus according to claim 12, wherein the processor is further configured to make the relay device:
observe that no path connecting the relay device to said other communications device is compatible with multipath connections; and
if the communications device receives a message for initializing a multipath connection from said client device for relaying to the other communications device, respond to the client device without using the multipath connection protocol in its response.

14. An IP network node comprising:
a non-transitory computer-readable medium comprising instructions stored thereon; and
a processor configured by the instructions to perform acts comprising:
broadcasting non-requested messages containing information about compatibility of said IP network node with multipath connections, said information comprising an indicator having a value selected by said IP network node among a set of values comprising at least a first value meaning that all multipath connection options are eliminated by the IP network node, a second value meaning that the IP network node is capable of interpreting all multipath connection options, and at least one other value indicating explicitly at least one list of options that the IP network node is capable of interpreting in an event that the IP network node filters only some multipath connection options.

15. An IP network node comprising:
a non-transitory computer-readable medium comprising instructions stored thereon; and
a processor configured by the instructions to perform acts comprising:
receiving from a communications device, in an absence of any multipath connection set up or initiated by said communications device over a path passing via said node, a request about compatibility of the node with multipath connections; and
responding to said communications device by a message containing information about the compatibility of the node with multipath connections, said information comprising an indicator having a value selected by said IP network node among a set of values comprising at least a first value meaning that all multipath connection options are eliminated by the IP network node, a second value meaning that the IP network node is capable of interpreting all multipath connection options, and at least one other value indicating explicitly at least one list of options that the IP network node is capable of interpreting in an event that the IP network node filters only some multipath connection options.

16. A non-transitory computer-readable medium comprising computer program code instructions stored thereon for executing a communications method when the instructions are executed by a processor of an IP network node, wherein the method comprises:
performing at least one of:
broadcasting non-requested messages containing information about compatibility of said IP network node with multipath connections, said information comprising an indicator having a value selected by said IP network node among a set of values comprising at least a first value meaning that all multipath connection options are eliminated by the IP network node, a second value meaning that the IP network node is capable of interpreting all multipath connection option, and at least one other value indicating explicitly at least one list of options that the IP network node is capable of interpreting in an event that the IP network node filters only some multipath connection options; or
receiving from a communications device, in an absence of any multipath connection set up or initiated by said communications device over a path passing via said IP network node, a request about compatibility of the IP network node with multipath connections, and responding to said communications device by sending a message containing information about the compatibility of the node with multipath connections, said information comprising the indicator having the value selected by said IP network node among the set of values.

17. The IP network node according to claim 14, wherein the IP network node is on a path connecting a client device, or a relay device connected to said client device, to some other client device, and wherein the processor is further configured to broadcast the non-requested messages containing the information about compatibility with multipath connections to the client device or else the relay device in the absence of any multipath connection on the path between said client device, or said relay device, and the other client device and before any multipath connection is initiated on the path between said client device, or said relay device, and the other client device.

18. The communication method according to claim 1, wherein the status is compatible if the indicator has the second value and incompatible if the indicator has the first value.

* * * * *